United States Patent
Zheng

(10) Patent No.: US 10,673,613 B2
(45) Date of Patent: Jun. 2, 2020

(54) POLYNOMIAL FULLY HOMOMORPHIC ENCRYPTION SYSTEM BASED ON COEFFICIENT MAPPING TRANSFORM

(71) Applicant: Kewei Zheng, Shanghai (CN)

(72) Inventor: Kewei Zheng, Shanghai (CN)

( * ) Notice: Subject to any disclaimer, the term of this patent is extended or adjusted under 35 U.S.C. 154(b) by 327 days.

(21) Appl. No.: 15/736,648

(22) PCT Filed: Mar. 9, 2016

(86) PCT No.: PCT/CN2016/075935
§ 371 (c)(1),
(2) Date: Dec. 14, 2017

(87) PCT Pub. No.: WO2016/169346
PCT Pub. Date: Oct. 27, 2016

(65) Prior Publication Data
US 2018/0183570 A1  Jun. 28, 2018

(30) Foreign Application Priority Data

Apr. 21, 2015 (CN) .......................... 2015 1 0192143

(51) Int. Cl.
*H04L 9/00* (2006.01)
*H04L 9/30* (2006.01)
*G09C 1/00* (2006.01)
*H04L 9/08* (2006.01)

(52) U.S. Cl.
CPC ................ *H04L 9/008* (2013.01); *G09C 1/00* (2013.01); *H04L 9/3093* (2013.01); *H04L 9/0861* (2013.01); *H04L 2209/46* (2013.01)

(58) Field of Classification Search
CPC ... H04L 9/008; H04L 9/3093; H04L 2209/46; H04L 9/0861; G09C 1/00
See application file for complete search history.

(56) References Cited

U.S. PATENT DOCUMENTS

2010/0067702 A1* 3/2010 Kusakawa ............. H04N 7/165
380/282
2014/0233731 A1* 8/2014 Naccache ............... H04L 9/008
380/44

* cited by examiner

*Primary Examiner* — Huan V Doan
(74) *Attorney, Agent, or Firm* — CBM Patent Consulting, LLC

(57) ABSTRACT

A polynomial complete homomorphic encryption method based on the coefficient mapping transformation. A plaintext is expressed as a polynomial consisting of a set of random values, two sets of random coefficient factors and a random constant of a specified mapping function, and in the polynomial: the expression and a set of random coefficient factors of the specified mapping function are taken as a key; another set of random coefficient factors, a set of random arguments and random constants of the mapping function are taken as the ciphertexts for homomorphic operations, so that the part of function key performs three different mappings and then undergoes numerical fitting to obtain the family of operational support functions consisting of three sub-functions respectively, which are used to perform the homomorphic operation of the ciphertext based on the family of operational support functions and return to the locality for decryption by the key.

12 Claims, 3 Drawing Sheets

POLYNOMIAL FULLY HOMOMORPHIC ENCRYPTION SYSTEM BASED ON COEFFICIENT MAPPING TRANSFORM

This application is the U.S. national phase of International Application No. PCT/CN2016/075935 Filed on 9 Mar. 2016 which designated the U.S. and claims priority to Chinese Application No. CN 201510192143.1 filed on 21 Apr. 2015, the entire contents of each of which are hereby incorporated by reference.

TECHNICAL FIELD

The invention relates to a technology in the field of information security, and more specifically, to a polynomial complete homomorphic encryption SYSTEM based on the coefficient mapping transformation.

DESCRIPTION OF RELATED ART

Homomorphic encryption is an encryption method that processes data that have been cryptographically isomorphic to produce an output that is decrypted, the result of which is the same as that output from the same method of processing unencrypted raw data.

In 1978, Rivest, Adleman and Dertouzos first proposed the concept of homomorphic encryption in On Data Banks and Privacy Homomorphisms (Foundations of Secure Communication, pp. 169-177, Academic Press), and at that time they used the term "privacy homomorphism". In this paper, Rivest et al., proposed several candidate encryption algorithms simultaneously, which have the characteristics of homomorphism. The polynomial encryption algorithm is one of them. Although it has the advantages of simple principle, easy implementation and high computing speed, it cannot be directly used because it is vulnerable to a plaintext attack and the security is not guaranteed. Other candidate algorithms were soon found with the potential security issues and, at the same time, slowly faded out of sight because of the lack of new algorithms. The issue of homomorphic encryption was again of interest to fellow scholars in 1991, and Feigenbaum, Merritt's Open Questions, Talk Abstracts, and Summary of Discussions (DIMACS Series in Discrete Mathematics and Theoretical Computer Science, Vol 2, pp. 1-45) reviewing several outstanding issues in the field of applied mathematics reinstated the thinking on this important issue. However, the research results were still very few later, without any breakthrough.

In 2009, Craig Gentry first disclosed a homomorphic encryption algorithm based on ideal lattices in his Ph.D. thesis: A Fully Homomorphic Encryption Scheme, and formally used the term "fully homomorphic encryption", which lays a foundation for the research in this field. This method introduces the "random noise" for encryption and uses the RSA-like algorithm to solve the problem of integer factorization as a basis for its security. The data cleaning operation is introduced after each step of homomorphic operation so that the size of the noise is always kept without affecting the range of the calculation result. However, due to the complexity of the algorithm, the complexity of the operation, and the encryption of each bit of plaintext, which results in a huge amount of computation and a large storage space required for the ciphertext, it is difficult to be applied to actual services.

Almost all of the research has since been revamped and enhanced around Craig's approach. Against many problems such as a large amount of computation, a large ciphertext storage space and a high ciphertext expansion speed of the original method, a great number of research has been done and many achievements have been made, such as Fully Homomorphic Encryption without Bootstrapping disclosed by Z. Brakerski, C. Gentry, and V. Vaikuntanathan in ITCS 2012 and Efficient Fully Homomorphic Encryption from (Standard) LWE disclosed by Z. Brakerski and V. Vaikuntanathan in FOCS 2011 (IEEE). The framework based on the original method proposes a BGV method taking Learning with Errors (LWE) as the basis of security, which reduces the computational complexity of homomorphic computation and makes the growth of noise variable more slow, thus reducing the data cleaning operation. On-the-Fly Multiparty Computation on the Cloud via Multikey Fully Homomorphic Encryption disclosed by Lopez-Alt, Tromer and Vaikuntanathan in STOC 2012 ACM proposes a LTV method based on the principle of on-grid encryption, which is also based on the optimized goal of reducing the amount of computation and slowing the growth of noise. Batch Fully Homomorphic Encryption over the Integers disclosed by Coron, Lepoin and Tibouchi in EUROCRYPT 2013 Springer has been improved based on the original method so that the encryption for all bits can be compressed into the same ciphertext, not only effectively reducing the size of the ciphertext, but also to some extent reducing the amount of computation; however, the noise still cannot be effectively controlled, so the data cleaning operation is still indispensable.

The research results listed above, as well as almost all the other studies, cannot completely get rid of the ideas and framework of the original Craig method. Therefore, although the new method has made substantial improvements over the original method, the actual implementation of the algorithm still requires huge computational resources and storage resources and is hard to be actually applied to actual services. This is why, although the demand is clear, so far there have not been any examples of commercial applications of homomorphic encryption algorithms in the world.

BRIEF SUMMARY OF THE INVENTION

In view of the above shortcomings in the prior art, the invention proposes a polynomial complete homomorphic encryption SYSTEM based on the coefficient mapping transformation, which directly operates on ciphertext without revealing plaintext to provide a safe data storage and an operating environment Based on the improved polynomial homomorphic encryption principle, the invention can directly encrypt an arbitrary integer or a real number, and performs the function mapping transformation on the polynomial coefficient and takes the mapping function itself as a part of the key, thus eliminating the potential dangers of the original method relying on the difficulty in solving the general-form function equation. Compared with the prior art, the computing speed is significantly increased, and the required ciphertext volume and expansion speed are smaller, which is more conducive to the achievement of various ways, so that the data owners can safely use various cloud computing services without having to worry about their sensitive and confidential data that would be revealed. The cloud service providers can also focus on customer value and service excellence without having to worry that the customers are afraid to use the services that they provide for fear of the data security.

The invention is achieved based on the following technical solutions:

The invention relates to a polynomial complete homomorphic encryption system, comprising a client and a server, wherein:

the client consists of a circuit which is configured to generate a key K and an operation supporting function family G, and to encrypt the plaintext P or decrypt the ciphertext C;

the server consists of a memory which is configured to receive the ciphertext C and the operation supporting function family G, and a circuit which is to perform a homomorphic operation on the ciphertext according to the operation supporting function family G.

Preferably, the server is provided with a database for storing the ciphertext, and more preferably, provided with a ciphertext ID corresponding to the ciphertext.

The homomorphic operation comprises four basic operations between ciphertext and plaintext or ciphertext, that is, addition, subtraction, multiplication and division.

Once generated, the key K is stored only on the client, neither allowing the external programs or unauthorized visitors to access the key, nor sending or transmitting the key in any form. Therefore, the data encryption and decryption operations must be done locally on the client side.

More preferably, the client is provided with a complete key access control mechanism. For example, the key is stored in a proprietary encryption memory chip, so that the way of authentication such as the access password verification or the finger authentication is required when the key is read to ensure that the visitor owns the corresponding authority.

The System above performs polynomial complete homomorphic encryption as the following steps: Firstly, a plaintext is expressed as a polynomial consisting of a set of random values, two sets of random coefficient factors and a random constant of a specified mapping function, and in the polynomial: the expression and a set of random coefficient factors of the specified mapping function are taken as a key; another set of random coefficient factors, a set of random arguments and random constants of the mapping function are taken as the ciphertexts for homomorphic operations, so that the part of function key performs three different mappings and then undergoes numerical fitting to obtain the family of operational support functions consisting of three sub-functions respectively, which are used to perform the homomorphic operation of the ciphertext based on the family of operational support functions and return to the locality for decryption by the key.

The invention specifically comprises the following steps:

Step 1: for a plaintext P∈R of any real number, the real-number vectors of $A=\{a_i|i \in I\}$ and $Y=\{y_i|i \in I\}$ are randomly chosen, satisfying that:

$$\begin{cases} \sum_{i \in I} a_i \cdot f(x_i) \cdot y_i + B = P \\ f(x_i) > 0 \end{cases} \quad (1)$$

wherein: f(x) is differentiable, and the real-number vectors are $X=\{x_i|i \in I\}$ and B∈R, I is the subscript set of the polynomial key dimension, usually, $I=\{1, 2\}$; $f(x_i)$ is the part of function key, preferably, the composite function $f(\ )$ is a periodic function.

The corresponding key generated is $K=\{f(\ ),Y\}$, the ciphertext for P is: $C=\{A, X, B\}$.

The numerical fitting adopts, but not limited to, the least square method.

Step 2: the homomorphic result of the ciphertext $C_r$ is obtained by way of performing the homomorphic operation between the ciphertexts or between the plaintext and the ciphertext through the operation supporting function family G at different places.

The homomorphic operations comprise addition, subtraction, multiplication and division, and any combination thereof.

Step 3: the homomorphic result of the plaintext $P_r$ is obtained via decryption by way of substituting the homomorphic result of the ciphertext $C_r$ into $f$ and Y in the key of K.

Technical Effects

Comparing with the prior art, the greatest improvement of the invention lies in the computational efficiency of the homomorphic operation and the requirement of storage space for the ciphertext: the plaintext space of the encryption algorithm in the invention is the entire real-number set R, the ciphertext space is $R^n$, and when n=5, adequate security can be ensured. The requirement of storage space for the entire ciphertext is significantly reduced comparing with the prior art. For a plaintext of common numerical type, a ciphertext can be obtained via the operation of encryption algorithm only once, whereas the prior art requires repeated iterative operations, which greatly speeds up the operation of encryption and decryption. Meanwhile, for the homomorphic operation of ciphertext, the operation process of the method in the invention has a higher speed but fewer iterative steps, and the ciphertext expansion speed of the operation result is also much lower than the prior art.

In addition, under the background that the cloud computing service is widely used, the technology of homomorphic encryption in the invention can make the real value of the data visible only to the data owner who owns the key; the data storage side, data transmission pipes and data operators who cannot guarantee the security, data will appear in the form of ciphertext, so that the storage, transmission and operation providers can only provide the corresponding storage space, transmission bandwidth and computing power, but cannot know the real value of the data at all. The result of the calculation is still expressed in ciphertext, and the data owner can decrypt it with the password so that the correct result is obtained.

DETAILED DESCRIPTION OF THE INVENTION

The embodiments of the invention are described in detail below. The embodiments are implemented on the premise of the technical solutions in the invention, with the detailed implementation manners and specific operation procedures given. However, the protection scope of the invention is not limited to the following embodiments.

Embodiment 1

Figure 1:
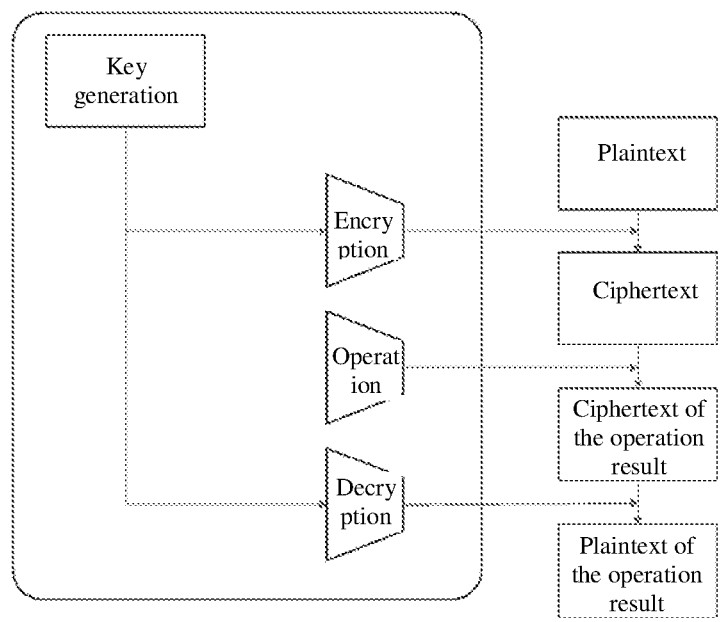
FIG. 1 is a schematic diagram of the basic application of the invention.
Figure 2:
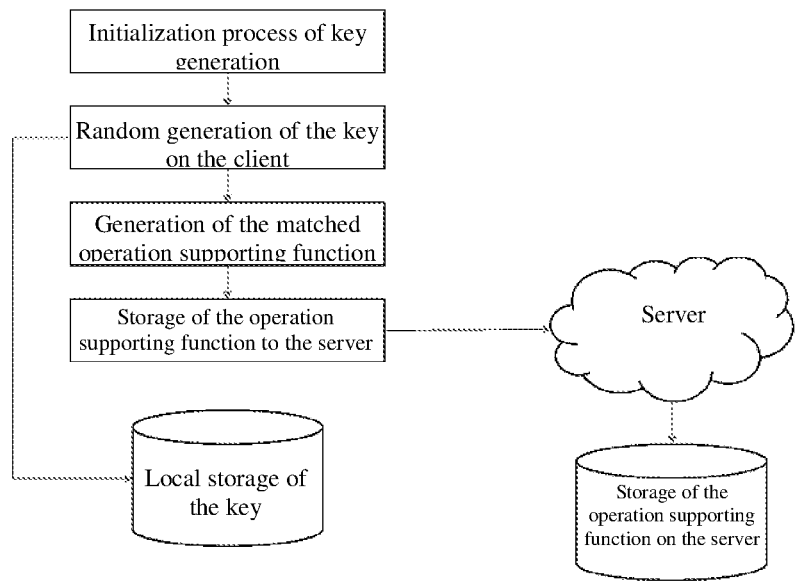
FIG. 2 is a schematic diagram of the process of key generation according to the invention.

The invention can be implemented in various ways corresponding to different requirement environments and application scenarios, such as USBKey, API, SDK, chip, expansion card, dedicated device. As shown in FIG. 1 and FIG. 2, any way of implementation comprises the client and the server, and the steps of a typical homomorphic encryption operation are as follows:

1) the client invokes a locally-stored key to encrypt sensitive plaintext data to obtain a ciphertext;

2) the client sends the ciphertext and the operation request to the server, with the key reserved on the client;

3) the server invokes the corresponding operation supporting function family and uses the homomorphic function to perform the required operation on the ciphertext uploaded by the client, and then returns the operation result of the ciphertext;

4) the client receives the resulted ciphertext, invokes the local key to decrypt, and outputs the resulted plaintext.

In such a process, the key and plaintext data only appear on the client, and the data are always in the form of ciphertext throughout the transmission, operation and storage operations, so there is no possibility of data leakage.

The following is a detailed description of the homomorphic encryption operation:

Step 1: a key that consists of the function key part and the polynomial key part is generated on the client as follows:

1.1) a number of unitary or multivariate functions are randomly chosen, and for each unitary or multivariate function, the parameters are randomly generated for the linear combination or composite combination to form the function key part, that is, $f(\ )$.

The unitary functions comprise but are not limited to various analytic functions, such as positive proportional function, inverse proportional function, sine function, cosine function, logarithmic function, exponential function and power function.

For example, a linear combination of a unitary sine function $\sin(x)$ and a unitary power function $x^3$ may form a function key $f(x)=10 \sin(6x)+5x^3$, or a composite combination may generate a function key $f(x)=12 \sin(8x^3+6)$.

When the strength of encryption needs to be increased, the binary or multivariate functions are chosen to constitute the function key part; taking a binary function as an example: $f(m_i,n_j), i \in I, j \in I$, the corresponding ciphertext will have more than one dimension, that is $C=\{A, M, N, B\}$ and meanwhile, the operation supporting function family G will become more complex while the corresponding key strength will be increased, but the corresponding amount of operation is also larger.

The function key part is a differentiable function, and its value in the definition domain should be greater than zero.

In this embodiment, preferably, the function key part that changes relatively flatly is used.

The change refers to $$\left|\frac{\partial f}{\partial x}\right| \leq K, x \in D,$$

wherein: D is the definition domain of $f(\ )$, K is a positive real number, that is, a flat index.

In this embodiment, preferably, the flat index is less than or equal to 10.

In this embodiment, a basic list of functions satisfying the requirement is preset in a key generation algorithm implemented on the client, so that these basic functions may be randomly combined during generation to obtain the function form of the function key part.

1.2) The polynomial key part $Y\{y_i | i \in I\}$ is randomly generated, thus forming a complete key, that is, $K=\{f(\ ),Y\}$.

In this embodiment, preferably, the polynomial key part $y_i$ is required to be a positive integer.

The key can be stored in any encryption medium local to the client, such as an encrypted file, an encryption chip, a USB flash drive, or other similar types of memory.

1.3) The client or server generates the operation supporting function family $G=\{g_1, g_2, g_3\}$ through function fitting which is saved by the server. Since each operation supporting function family G corresponds to a function key, the corresponding user, that is, the unique identifier of the ciphertext sender, needs to be recorded when the server receives the operation supporting function family G.

The fitting generation can be directly performed on the client, and the result of the fitting, that is, the expression of the operation supporting function family G, is transmitted to the server; the client can also perform discrete sampling of the operation supporting function family G and output the sampling point data to the server, so that the operation supporting function family G can be calculated by the server according to the local fitting strategy or the dynamic local fitting strategy;

During the process of computer operations, a problem of precision may occur in the floating-point operation, so the fitting described can be set to the required precision at initialization based on the specific hardware settings.

The operation supporting function family G comprises the numerical fitting of $$\begin{cases} g_1(\alpha, \beta) \\ g_2(\alpha, \beta) \\ g_3(\alpha, \beta) \end{cases} \quad (2)$$

wherein: $g_1(\alpha,\beta)$ is the numerical fitting of $$\frac{f(\alpha)}{f(h_1(\alpha, \beta))} g_2(\alpha, \beta)$$

is the numerical fitting of $$\frac{f(\beta)}{f(h_1(\alpha, \beta))},$$

$g_3(\alpha,\beta)$ is the numerical fitting of $$\frac{f(\alpha) \cdot f(\beta)}{f(h_2(\alpha, \beta))},$$

while $\alpha、\beta \in X$, $h_1(\alpha,\beta)$ and $h_2(\alpha,\beta)$ are any functions that satisfy $h_1(\alpha,\beta) \neq h_2(\alpha,\beta) \neq \alpha \neq \beta$.

In this embodiment, $h_1 = \alpha + \beta + 1$, $h_2 = \alpha + \beta + 2$, $\alpha > 0$ and $\beta > 0$ are chosen.

Preferably, the operation supporting function family G does not appear in the form of an expression so as to improve the security of the invention; more preferably, it appears in the form of a numerical fitting to express the operation supporting function family G.

In some cases, for example, if the function key part $f$ itself is not complex enough, it can still be solved to a certain degree by some very huge number of operations, and the function key part f can be locally restored by the operation supporting function family G. So a variety of G deformations can be defined to improve the security, and there are many types of such deformations.

The numerical fitting means that the values of G corresponding to each sampling point are recorded through wide and intensive discrete sampling of the definition domain of the operation supporting function family G, and then approximate expressions of G are made through the surface fitting technology; the embodiments are implemented using the surface fitting technology and the numerical calculation technology, such as using the least-square method to perform the surface fitting.

When the surface of the operation supporting function family G is too complex, the numerical value fitting can be obtained by re-splicing upon the local fitting or the method of dynamic local fitting. That is to say, when getting a value by operation is required, the final value can be obtained by means of local surface fitting in the surface area in the vicinity of the value evaluation point.

It is very difficult to restore the expression of $f$ without knowing the concrete form of the original function $f$ only by computing the fitting expression of the operation supporting function family G or the discrete value point information. This is also one of the security guarantees of the encryption method in the invention.

Described here is the key generation process, that is, the client initialization process. This process is only initialized before a user uses the system for the first time, and the user only needs to directly access the generated key in future use.

Figure 3:
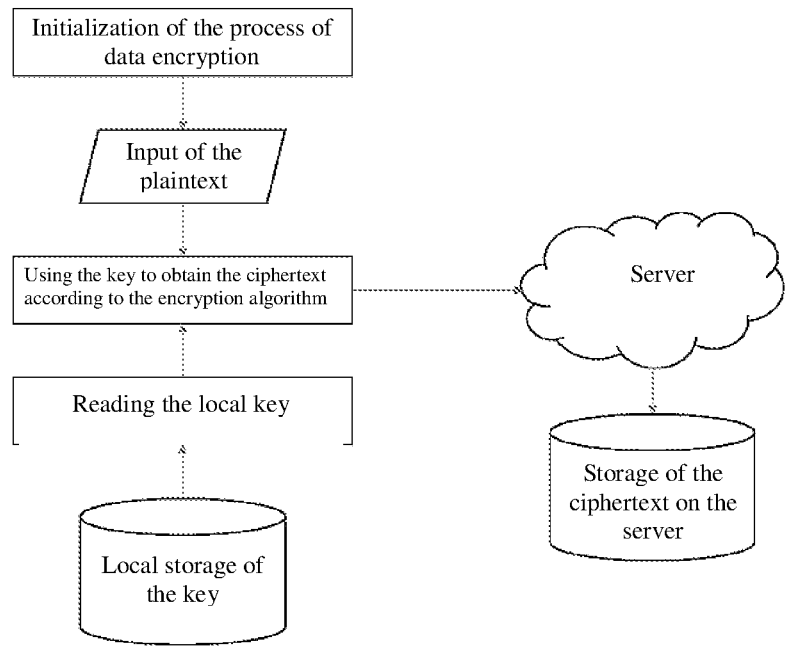
FIG. 3 is a schematic diagram of the embodiment of the process of data encryption.

Step 2: as shown in FIG. 3, the sensitive data are encrypted by using the generated key as follows:

The data to be encrypted in this embodiment are the production cost $P_1$ of one product and the total sales contract offer $P_2$ of the product, both of which are floating-point numerical data.

2.1) For the function key part $f(\ )$, an argument $x_i$ is randomly chosen in its definition domain to obtain the function value $f(x_i)$ of the point, and then the function value is multiplied by the corresponding component of the polynomial key to obtain $f(x_i) \cdot y_i$, wherein $i \in I$ and I is the subscript set of the polynomial key dimensions.

Each element in the set of polynomial key dimensions is a positive integer, and the maximum value of 2 can meet the security requirement; the value can be increased according to the encryption strength requirement, and generally, the maximum value should not be greater than 10. If the maximum value is 4, I is equal to the set $\{1,2,3,4\}$.

2.2) $a_i$ is randomly chosen to obtain an item, $a_i \cdot f(x_i) \cdot y_i$, of the ciphertext polynomial.

2.3) Step 2.1~2.2 are repeated until iterating through the set of I, and $$\sum_{i \in I} a_i \cdot f(x_i) \cdot y_i$$

is finally obtained.

2.4) B is obtained by Formula 1), and so far, all components of the ciphertext, $A = \{a_i | i \in I\}$ and $X = \{x_i | i \in I\}$, as well as B, have been obtained. The ciphertext $C_1, C_2$ corresponding to the preceding plaintext $P_1, P_2$ is obtained in this process.

When the function key part is a binary function, the corresponding ciphertext is $C = \{A, M, N, B\}$ and the corresponding encryption strength is greatly improved.

Figure 5:
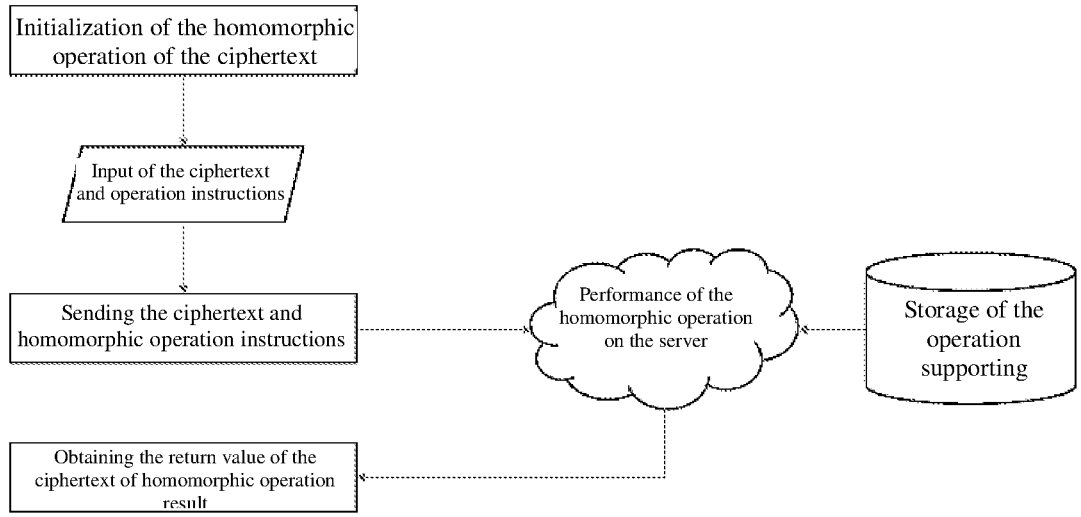
FIG. 5 is the second schematic diagram of the embodiment of the homomorphic operation of ciphertext.

Step 3: as shown in FIG. 5, after the server obtains multiple ciphertexts, homomorphic operations on ciphertexts, including addition, subtraction, multiplication and division, are performed based on the operation supporting function family G stored on the server.

i) The addition and subtraction in homomorphism are taken as an example. Supposing an enterprise needs to calculate the gross profit of the product sales contract, wherein the production cost of the product is sensitive data and its ciphertext is $C_1$; the total offer of the contract is sensitive data and its ciphertext is $C_2$; the quantity of product sales is the non-sensitive data of the open bidding without encryption and its value is 100, then the gross profit of the contract can be calculated as ciphertext $C_3$, that is $C_3 = C_2 - 100 * C_1$, and the server can obtain the gross profit $C_3$, that is $C_3 = \{A_3, X_3, B_3\}$, by sequentially calculating $100 \cdot C_1$ and $C_2 - 100 \cdot C_1$, wherein:

$$A_3 = \{a_{3i} | i \in I\}, a_{3i} = a_{2i} \cdot g_2(x_{1i}, x_{2i}) - 100 \cdot a_{1i} \cdot g_1(x_{1i}, x_{2i})$$

$$X_3 = \{x_{3i} | i \in I\}, x_{3i} = h_1(x_{2i}, x_{1i})$$

$$B_3 = B_2 - 100 \cdot B_1$$

The calculation result of the homomorphic encryption may be stored in a ciphertext manner in a database and used in other operations afterwards without needing to know the actual value of the ciphertext, and only when the form is displayed or the report is printed, the decryption algorithm is invoked on the client and the plaintext can be restored, for the authorized user who owns the key.

ii) The multiplication in homomorphism is taken as an example. Supposing an enterprise signs the same product sales contract with several customers at the same time with the number of contracts being sensitive data and the ciphertext being $C_4$, the total gross profit $C_5$ is: $C_5 = C_3 \cdot C_4$ and $C_5 = \{A_5, X_5, B_5\}$, wherein:

$$A_5 = \{a_{5ij} | i \in I, j \in I\} \cup \{B_4 \cdot a_{3i} | i \in I\} \cup \{B_3 \cdot a_{4j} | j \in I\},$$
$$a_{5ij} = a_{3i} \cdot a_{4j} \cdot g_3(x_3, x_4)$$

$$X_5 = \{x_{5ij} | i \in I, j \in I\} \cup \{x_{3i} | i \in I\} \cup \{x_{4j} | j \in I\}, x_{5ij} = h_2(x_{3i}, x_{4j})$$

$$B_5 = B_3 \cdot B_4$$

iii) The division of homomorphism is taken as an example. The polynomial division algorithm is used to introduce the fractional expression, and after the denominator polynomial is increased, the division is converted into the combination of addition and multiplication, so that the calculation result is obtained finally. Therefore, in the context of division, the expression of a more general plaintext should be in a fractional form, such as $$P = \frac{P_1}{P_2} = \frac{\sum_{i \in I} a_{1i} \cdot f(x_{1i}) \cdot y_i + B_1}{\sum_{i \in I} a_{2i} \cdot f(x_{2i}) \cdot y_i + B_2}.$$

The ciphertext is specifically expressed as:

$$P_a = \frac{P_1}{P_2} = \frac{\sum_{i\in I} a_{1i} \cdot f(x_{1i}) \cdot y_i + B_1}{\sum_{i\in I} a_{2i} \cdot f(x_{2i}) \cdot y_i + B_2}$$

$$C_a = \{A_1, X_1, B_1, A_2, X_2, B_2\}$$

$$P_b = \frac{P_3}{P_4} = \frac{\sum_{i\in I} a_{3i} \cdot f(x_{3i}) \cdot y_i + B_3}{\sum_{i\in I} a_{4i} \cdot f(x_{4i}) \cdot y_i + B_4}$$

$$C_b = \{A_3, X_3, B_3, A_4, X_4, B_4\}$$

then the result $C_r = \{A_5, X_5, B_5, A_6, X_6, B_6\}$ of the division $C_r = C_a / C_b$ is:

$A_5 = \{a_{5ij} | i\in I, j\in I\} \cup \{B_3 \cdot a_{1i} | i\in I\} \cup \{B_1 \cdot a_{3j} | j\in I\},$
$\quad a_{5ij} = a_{1i} \cdot a_{3j} \cdot g_3(x_1, x_3)$ $X_5 = \{x_{5ij} | i\in I, j\in I\} \cup \{x_{1i} | i\in I\} \cup \{x_{3j} | j\in I\}, x_{5ij} = h_2(x_{1i}, x_{3j}) B_5 = B_1 \cdot B_3$ $A_6 = \{a_{6ij} | i\in I, j\in I\} \cup \{B_4 \cdot a_{2i} | i\in I\} \cup \{B_2 \cdot a_{4j} | j\in I\},$
$\quad a_{6ij} = a_{2i} \cdot a_{4j} g_3(x_2, x_4)$ $X_6 = \{x_{6ij} | i\in I, j\in I\} \cup \{x_{2i} | i\in I\} \cup \{x_{4j} | j\in I\}, x_{6ij} = h_2(x_{2i}, x_{4j}) B_6 = B_2 \cdot B_4$ In a fractional form, when the ciphertext homomorphism addition is performed, the fractions must be reduced to a common denominator, that is, the molecular part of a ciphertext is multiplied by the denominator part of another ciphertext as a new molecule, and then the new molecule is summed up with a new molecule part of another ciphertext upon the same operation to generate the numerator of the result. At the same time, the denominator parts of two ciphertexts are multiplied as the denominator of the result, and the final result is obtained after simplification.

In a fractional form, when the homomorphic operation of multiplication of the ciphertext is performed, the numerator and denominator of the two ciphertexts are multiplied respectively as a new numerator and denominator, and the final result is obtained after simplification.

In Step 3, when the homomorphic operation is performed on the server, the server may adopt the ciphertext-ID-based method to perform the homomorphic calculation upon retrieval to the cached ciphertext or through the acceptance of the ciphertext and operator sent by the client directly.

The ciphertext ID is an ID number corresponding to the cached ciphertext, and preferably, the ID number is stored on the client.

Figure 4:
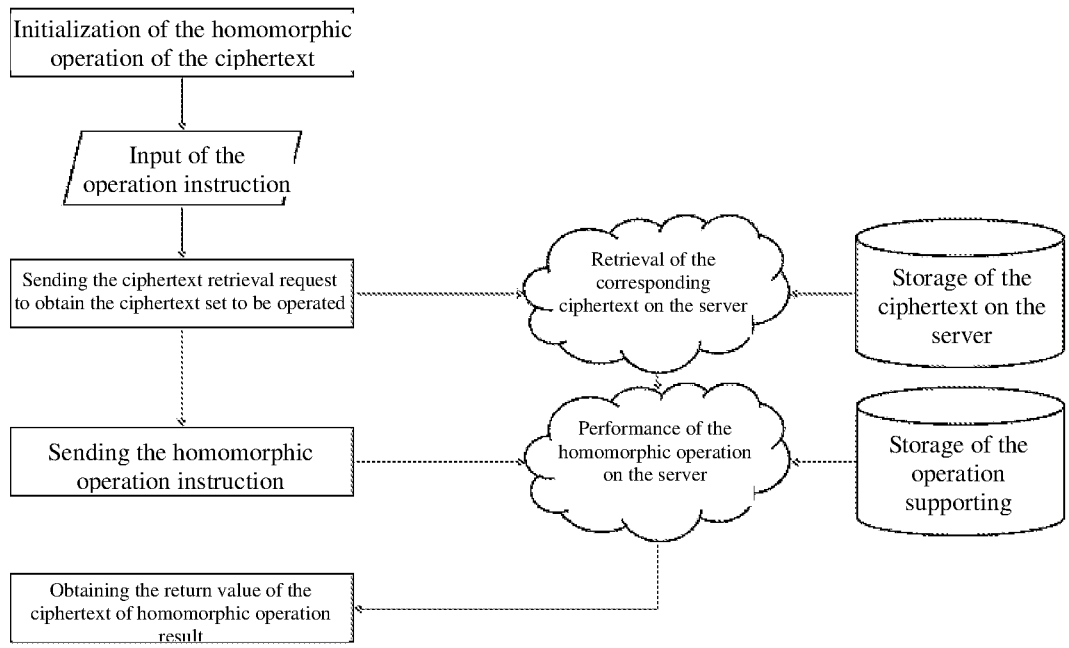
FIG. 4 is the first schematic diagram of the embodiment of the homomorphic operation of ciphertext.

As shown in FIG. 4, in order to use the process of the ciphertext ID homomorphic operation, the specific steps comprise:

1) The client obtains the operation instruction, including the ciphertext ID that needs to be involved in the operation and the operation operators and other parameters that need to be performed.

2) The ciphertext ID, the homomorphic operator and the operation parameters are sent to the server to retrieve the corresponding ciphertext and wait for the operation; after receiving the instruction, the server first reads the corresponding operation supporting function family and then performs the homomorphic operation on the ciphertext retrieved in the previous step according to the operation instruction.

3) The server returns the result of the homomorphic operation to the operation requester, and the operation result is still in the form of ciphertext.

As shown in FIG. 5, in order to directly use the ciphertext instead of the homomorphic operation of the ciphertext ID, the specific steps comprise:

i) the arithmetic instructions, including the ciphertext to be calculated, arithmetic operators and other parameters, are obtained;

ii) the ciphertext, operator, operation parameters and other data are sent to the server;

iii) after obtaining the operation instruction, the server reads the corresponding operation supporting function family and completes the operation requirement on the ciphertext to obtain the ciphertext of the operation result;

iv) the server returns the operation result to the operation requester.

Figure 6:
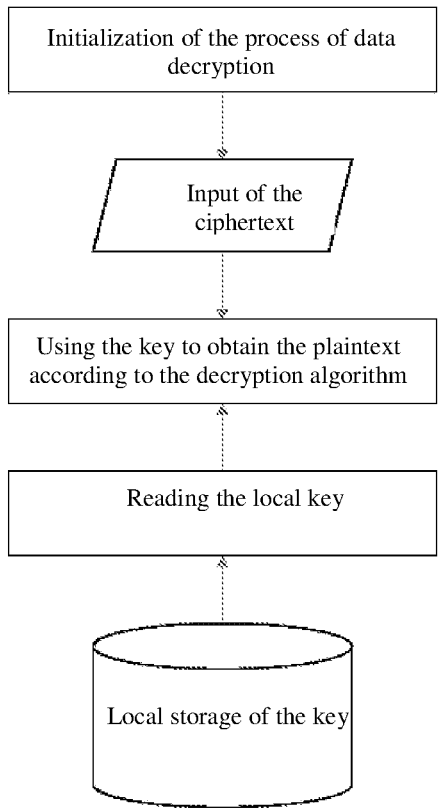
FIG. 6 is a schematic diagram of the embodiment of the process of data decryption.

In Step 4, as shown in FIG. 6, when the client obtains the resulted ciphertext upon the homomorphic operation from the server, the resulted ciphertext is substituted into the encryption formula (1) to obtain the corresponding plaintext result.

In case the original plaintext data are numerical, the result of the decryption in the previous step is the final result; otherwise, the type conversion is needed to obtain the final decryption result.

Embodiment 2

The difference between this embodiment and Embodiment 1 lies in that the operation supporting function G adopted comprises:

$$\begin{cases} g_1(\alpha, \beta, \gamma) \\ g_2(\alpha, \beta) \end{cases},$$

wherein $g_1(\alpha, \beta, \gamma)$ is the numerical fitting of $$\frac{h_3(\gamma) \cdot [f(\alpha) + \gamma \cdot f(\beta)]}{f(h_1(\alpha, \beta))},$$

$g_2(\alpha, \beta)$ is the numerical fitting of $$\frac{f(\alpha) \cdot f(\beta)}{f(h_2(\alpha, \beta))},$$

$\alpha, \beta \in X$, $h_1(\alpha,\beta)$, $h_2(\alpha,\beta)$ and $h_3(\alpha,\beta)$ are any functions that satisfy $h_1(\alpha,\beta) \neq h_2(\alpha,\beta) \neq h_3(\alpha,\beta) \neq \alpha \neq \beta$;

the corresponding homomorphic operation comprises:

i) addition and subtraction between ciphertext and ciphertext: $C_r = C_2 \pm C_1$, $C_r = \{A_r, X_r, B_r\}$ wherein:

$$A_r = \{a_{ri} | i \in I\}, a_{ri} = a_{2i} \cdot g_1\left(x_{2i}, x_{1i}, \pm \frac{a_{1i}}{a_{2i}}\right) / h_3\left(\pm \frac{a_{1i}}{a_{2i}}\right),$$

$$X_r = \{x_{ri} | i \in I\}, x_{ri} = h_1(x_{2i}, x_{1i}),$$

$$B_r = B_2 \pm B_1;$$

ii) multiplication between ciphertext and ciphertext: $C_r = C_3 \cdot C_4$, $C_r = \{A_r, X_r, B_r\}$, wherein:

$A_r=\{a_{rij}|i\in I,j\in I\}\cup\{B_4\cdot a_{3i}|i\in I\}\cup\{B_3\cdot a_{4i}|j\in I\}$,
$a_{rij}=a_{3i}\cdot a_{4i}\cdot g_2(x_3,x_4)$, $X_r=\{x_{rij}|i\in I,j\in I\}\cup\{x_{3i}|i\in I\}\cup\{x_{4j}|j\in I\}, x_{rij}=h_2(x_{3i},x_{4j})$, $B_r=B_3\cdot B_4$;

ii) division between ciphertext and ciphertext: $C_r=C_a/C_b$, $C_r=\{A_5, X_5, B_5, A_6, X_6, B_6\}$, wherein:

$A_5=\{a_{5ij}|i\in I,j\in I\}\cup\{B_3\cdot a_{1i}|i\in I\}\cup\{B_1\cdot a_{3j}|j\in I\}$,
$a_{5ij}=a_{1i}\cdot a_{3j}\cdot g_2(x_1,x_3)$, $X_5=\{x_{5ij}|i\in I,j\in I\}\cup\{x_{1i}|i\in I\}\cup\{x_{3j}|j\in I\}, x_{5ij}=h_2(x_{1i},x_{3j})$, $B_5=B_1\cdot B_3$;

$A_6=\{a_{6ij}|i\in I,j\in I\}\cup\{B_4\cdot a_{2i}|i\in I\}\cup\{B_2\cdot a_{4j}|j\in I\}$,
$a_{6ij}=a_{2i}\cdot a_{4j}\cdot g_2(x_2,x_4)$, $X_6=\{x_{6ij}|i\in I,j\in I\}\cup\{x_{2i}|i\in I\}\cup\{x_{4j}|j\in I\}, x_{6ij}=h_2(x_{2i},x_{4j})$, $B_5=B_3\cdot B_4$.

In this embodiment, g1 becomes a ternary function and the corresponding amount of fitting calculation will increase a lot, with the requirement for the flatness and complexity off also higher, but the corresponding security will be much higher than the binary function.

Embodiment 3

In order to improve the security, in this embodiment, a function f2 is introduced when the operation support function G is generated, and it does not need to be added to the key and only affects the calculation and expression of the operation supporting function G. It can be understood that the operation supporting function G is encrypted. The specific expression is as follows:

$$\begin{cases} g_1(\alpha,\beta) \\ g_2(\alpha,\beta) \\ g_3(\alpha,\beta) \\ g_4(\alpha,\beta) \\ g_5(\alpha,\beta) \\ g_6(\alpha,\beta) \end{cases},$$

wherein: $g_1(\alpha,\beta)$ is the numerical fitting of $$\frac{f(\alpha)\cdot f(h_3(\alpha,\beta))}{f_2(h_1(\alpha,\beta))},$$

$g_2(\alpha,\beta)$ is the numerical fitting of $$\frac{f(\beta)\cdot f(h_3(\alpha,\beta))}{f_2(h_2(\alpha,\beta))},$$

$g_3(\alpha,\beta)$ is the numerical fitting of $$\frac{f_2(\alpha)}{f(h_4(\alpha,\beta))},$$

$g_4(\alpha,\beta)$ is the numerical fitting of $$\frac{f_2(\beta)}{f(h_4(\alpha,\beta))},$$

$g_5(\alpha,\beta)$ is the numerical fitting of $$\frac{f(\alpha)\cdot f(\beta)}{f(h_5(\alpha,\beta))},$$

$g_6(\alpha,\beta)$ is the numerical fitting of $$\frac{f(\alpha)}{f(\beta)\cdot f(h_6(\alpha,\beta))},$$

$\alpha,\beta\in X$, $h_1(\alpha,\beta)$, $h_2(\alpha,\beta)$, $h_3(\alpha,\beta)$ and $h_4(\alpha,\beta)$ are any functions that satisfy $h_1(\alpha,\beta)\neq h_2(\alpha,\beta)\neq h_3(\alpha,\beta)\neq h_4(\alpha,\beta)\neq\alpha\neq\beta$; $f_2(\ )$ is a randomly generated function used for encrypting the operation supporting function, the corresponding homomorphic operation comprises:

i) Addition and subtraction between ciphertext and ciphertext: $C_r=C_2\pm C_1$, $C_r=\{A_r, X_r, B_r\}$, wherein:

$A_r=\{a_{ri}|i\in I\}$, $a_{ri}=g_6\cdot[a_{2i}\cdot g_1(x_{2i},x_{1i})\cdot g_3(h_1(x_{2i},x_{1i}),h_2(x_{2i},x_{1i}))\pm a_{1i}\cdot g_2(x_{2i},x_{1i})\cdot g_4(h_1(x_{2i},x_{1i}),h_2(x_{2i},x_{1i}))]$, $X_r=\{x_{ri}|i\in I\}$, $x_{ri}=h_6(h_4(h_1(x_{2i},x_{1i}),h_2(x_{2i},x_{1i})),h_3(h_1(x_{2i},x_{1i}),h_2(x_{2i},x_{1i})))$, $B_r=B_2\pm B_1$;

ii) multiplication between ciphertext and ciphertext: $C_r=C_3\cdot C_4$, $C_r=\{A_r, X_r, B_r\}$, wherein:

$A_r=\{a_{rij}|i\in I,j\in I\}\cup\{B_4\cdot a_{3i}|i\in I\}\cup\{B_3\cdot a_{4j}|j\in I\}$,
$a_{rij}=a_{3i}\cdot a_{4j}\cdot g_5(x_3,x_4)$, $X_r=\{x_{rij}|i\in I,j\in I\}\cup\{x_{3i}|i\in I\}\cup\{x_{4j}|j\in I\}, x_{rij}=h_2(x_{3i},x_{4j})$, $B_r=B_3\cdot B_4$;

ii) division between ciphertext and ciphertext: $C_r=C_a/C_b$, $C_r=\{A_5, X_5, B_5, A_6, X_6, B_6\}$, wherein:

$A_5=\{a_{5ij}|i\in I,j\in I\}\cup\{B_3\cdot a_{1i}|i\in I\}\cup\{B_1\cdot a_{3j}|j\in I\}$,
$a_{5ij}=a_{1i}\cdot a_{3j}\cdot g_5(x_1,x_3)$, $X_5=\{x_{5ij}|i\in I,j\in I\}\cup\{x_{1i}|i\in I\}\cup\{x_{3j}|j\in I\}, x_{5ij}=h_5(x_{1i},x_{3j})$, $B_5=B_1\cdot B_3$, $A_6=\{a_{6ij}|i\in I,j\in I\}\cup\{B_4\cdot a_{2i}|i\in I\}\cup\{B_2\cdot a_{4j}|j\in I\}$,
$a_{6ij}=a_{2i}\cdot a_{4j}\cdot g_5(x_2,x_4)$, $X_6=\{x_{6ij}|i\in I,j\in I\}\cup\{x_{2i}|i\in I\}\cup\{x_{4j}|j\in I\}, x_{6ij}=h_5(x_{2i},x_{4j})$, $B_6=B_2\cdot B_4$.

Such an operation supporting function G can prevent a huge amount of operation for fitting a ternary function and also greatly improve the security, wherein, f2 is randomly generated only when G is calculated during initialization, and the form of f2 is required to be as simple as possible to prevent using too complicated expressions. At the same time, f2 expression neither needs to be stored on the client, nor needs to be saved on the server, so that it can be directly discarded after the process of initialization. This neither affects the client's encryption and decryption operations, nor affects the server's homomorphic operation, so in this case the security of G is very high, and it is more difficult to restore the function key f through G.

What is claimed is:

1. A polynomial complete homomorphic encryption system comprising:
 a client; and
 a server;
 wherein the client consists of a circuit which is configured to generate a key K and an operation supporting function family G, and to encrypt a plaintext P or decrypt a ciphertext C;
 wherein the server consists of a memory which is configured to receive the ciphertext C and the operation supporting function family G, and a circuit which is to perform a homomorphic operation on the ciphertext according to the operation supporting function family G;
 wherein, for the plaintext P∈R of any real number, real-number vectors of $A=\{a_i|i\in I\}$ and $Y=\{y_i|i\in I\}$ are randomly chosen, satisfying that:

$$\begin{cases} \sum_{i \in I} a_i \cdot f(x_i) \cdot y_i + B = P \\ \quad f(x_i) > 0 \end{cases}$$

wherein f(x) is differentiable, and real-number vectors are $X=\{x_i|i\in I\}$ and B∈R, I is a subscript set of a polynomial key dimension, $f(x_i)$ is a function key part, the corresponding key generated is K={f( ), Y}, and the ciphertext for P is C={A, X, B};
 wherein the homomorphic result of the ciphertext is obtained by way of performing the homomorphic operation between the ciphertexts or between the plaintext and the ciphertext through the operation supporting function family G at different places; and
 wherein the homomorphic result of the plaintext is obtained via decryption by way of substituting the homomorphic result of the ciphertext into f and Y in the key of K.

2. The system as claimed in claim 1, characterized in that the server is provided with a database for storing ciphertexts.

3. The system as claimed in claim 1, characterized in that the server is provided with a ciphertext ID corresponding to the cached ciphertext.

4. The system as claimed in claim 1, characterized in that the client is provided with a key access control mechanism, which ensures that the visitor owns the authority to access the key by the way of authentication.

5. The system as claimed in claim 1, characterized in that the homomorphic operation of the ciphertext based on the family of operational support function family G and return to locality for decryption by the key K; wherein the plaintext P is expressed as a polynomial consisting of a set of random values, two sets of random coefficient factors and a random constant of a specified mapping function, and in the polynomial: the expression and a set of random coefficient factors of the specified mapping function are taken as a the key K; another set of random coefficient factors, a set of random arguments and random constants of the mapping function are taken as the ciphertexts for the homomorphic operations, so that the part of function key performs three different mappings and then undergoes numerical fitting to obtain the operational support function family G consisting of three sub-functions.

6. The system as claimed in claim 5, characterized in that the numerical fitting adopts the least square method.

7. The system as claimed in claim 5, characterized in that the homomorphic operations comprise addition, subtraction, multiplication and division, and any combination thereof.

8. The system as claimed in claim 5, characterized in that the operation supporting function G generated encrypts itself through the randomly generated function.

9. The system as claimed in claim 5, characterized in that; the operation supporting function family G used for the homomorphic operation of ciphertext comprises:

$$\begin{cases} g_1(\alpha, \beta) \\ g_2(\alpha, \beta), \\ g_3(\alpha, \beta) \end{cases}$$

wherein: $g_1(\alpha,\beta)$ is the numerical fitting of $$\frac{f(\alpha)}{f(h_1(\alpha, \beta))} g_2(\alpha, \beta)$$

is the numerical fitting of $$\frac{f(\beta)}{f(h_1(\alpha, \beta))},$$

$g_3(\alpha,\beta)$ is the numerical fitting of $$\frac{f(\alpha) \cdot f(\beta)}{f(h_2(\alpha, \beta))},$$

while $\alpha, \beta \in X$, $h_1(\alpha,\beta)$ and $h_2(\alpha,\beta)$ are any functions that satisfy $h_1(\alpha,\beta) \neq h_2(\alpha,\beta) \neq \alpha \neq \beta$.

the corresponding homomorphic operation comprises:
 i) addition and subtraction between ciphertext and ciphertext: $C_r=C_2 \pm C_1$, $C_r=\{A_r, X_r, B_r\}$, wherein:

$A_r=\{\alpha_{ri}|i\in I\}, \alpha_{ri}=\alpha_{2i} \cdot g_2(x_{1i},x_{2i}) \pm \alpha_{1i} \cdot g_1(x_{1i},x_{2i}),$ $X_r=\{x_{ri}|i\in I\}, x_{ri}=h_1(x_{2i},x_{1i}),$ $B_r=B_2 \pm B_1;$ ii) multiplication between ciphertext and ciphertext: $C_r=C_3 \cdot C_4$, $C=\{A_r,X_r,B_r\}$, wherein:

$A_r=\{a_{rij}|i\in I,j\in I\} \cup \{B_4 \cdot a_{3i}|i\in I\} \cup \{B_3 \cdot a_{4j}|j\in I\},$
$a_{rij}=a_{3i} \cdot a_{4j} \cdot g_3(x_3,x_4),$ $X_r=\{x_{rij}|i\in I,j\in I\} \cup \{x_{3i}|i\in I\} \cup \{x_{4j}|j\in I\}, x_{rij}=h_2(x_{3i},x_{4j}),$ $B_r=B_3 \cdot B_4;$ ii) division between ciphertext and ciphertext: $C_r=C_a/C_b$, $C_r=\{A_5,X_5,B_5,A_6,X_6,B_6\}$ wherein:

$A_5=\{a_{5ij}|i\in I,j\in I\} \cup \{B_3 \cdot a_{1i}|i\in I\} \cup \{B_1 \cdot a_{3i}|j\in I\},$
$a_{5ij}=a_{1i} \cdot a_{3j} \cdot g_3(x_1,x_3),$ $X_5=\{x_{5ij}|i\in I,j\in I\}\cup\{x_{1i}|i\in I\}\cup\{x_{3j}|j\in I\}, x_{5ij}=h_2(x_{1i},x_{3j})$, $B_5=B_1\cdot B_3$, $A_6=\{a_{6ij}|i\in I,j\in I\}\cup\{B_4\cdot a_{2i}|i\in I\}\cup\{B_2\cdot a_{4j}|j\in I\}$,
$a_{6ij}=a_{2i}\cdot a_{4j}\cdot g_3(x_2,x_4)$, $X_6=\{x_{6ij}|i\in I,j\in I\}\cup\{x_{2i}|i\in I\}\cup\{x_{4j}|j\in I\}, x_{6ij}=h_2(x_{2i},x_{4j})$, $B_6=B_2\cdot B_4$.

10. The system as claimed in claim 5, characterized in that the operation supporting function G comprises:

$$\begin{cases} g_1(\alpha,\beta,\gamma) \\ g_2(\alpha,\beta,) \end{cases},$$

wherein $g_1(\alpha,\beta,\gamma)$ is the numerical fitting of $$\frac{h_3(\gamma)\cdot[f(\alpha)+\gamma\cdot f(\beta)]}{f(h_1(\alpha,\beta))},$$

$g_2(\alpha,\beta)$ is the numerical fitting of $$\frac{f(\alpha)\cdot f(\beta)}{f(h_2(\alpha,\beta))},$$

$\alpha,\beta\in X$, $h_1(\alpha,\beta)$, $h_2(\alpha,\beta)$ and $h_3(\alpha,\beta)$ are any functions that satisfy $h_1(\alpha,\beta)\neq h_2(\alpha,\beta)\neq h_3(\alpha,\beta)\neq\alpha\neq\beta$;
the corresponding homomorphic operation comprises:
i) addition and subtraction between ciphertext and ciphertext: $C_r=C_2\pm C_1$, $C_r=\{A_r,X_r,B_r\}$, wherein:

$A_r=\{a_{ri}\mid i\in I\}$, $a_{ri}=a_{2i}\cdot g_1\left(x_{2i},x_{1i},\pm\dfrac{a_{1i}}{a_{2i}}\right)/h_3\left(\pm\dfrac{a_{1i}}{a_{2i}}\right)$, $X_r=\{x_{ri}\mid i\in I\}$, $x_{ri}=h_1(x_{2i},x_{1i})$, $B_r=B_2\pm B_1$;

ii) multiplication between ciphertext and ciphertext: $C_r=C_3\cdot C_4$, $C=\{A_r,X_r,B_r\}$, wherein:

$A_r=\{a_{rij}|i\in I,j\in I\}\cup\{B_4\cdot a_{3i}|i\in I\}\cup\{B_3\cdot a_{4j}|j\in I\}$,
$a_{rij}=a_{3i}\cdot a_{4j}\cdot g_2(x_3,x_4)$, $X_r=\{x_{rij}|i\in I,j\in I\}\cup\{x_{3i}|i\in I\}\cup\{x_{4j}|j\in I\}, x_{rij}=h_2(x_{3i},x_{4j})$, $B_r=B_3\cdot B_4$;

ii) division between ciphertext and ciphertext: $C_r=C_a/C_b$, $C_r=\{A_5, X_5, B_5, A_6, X_6, B_6\}$, wherein:

$A_5=\{a_{5ij}|i\in I,j\in I\}\cup\{B_3\cdot a_{1i}|i\in I\}\cup\{B_1\cdot a_{3j}|j\in I\}$,
$a_{5ij}=a_{1i}\cdot a_{3j}\cdot g_2(x_1,x_3)$ $X_5=\{x_{5ij}|i\in I,j\in I\}\cup\{x_{1i}|i\in I\}\cup\{x_{3j}|j\in I\}, x_{5ij}=h_2(x_{1i},x_{3j})$, $B_5=B_1\cdot B_3$, $A_6=\{a_{6ij}|i\in I,j\in I\}\cup\{B_4\cdot a_{2i}|i\in I\}\cup\{B_2\cdot a_{4j}|j\in I\}$,
$a_{6ij}=a_{2i}\cdot a_{4j}\cdot g_2(x_2,x_4)$, $X_6=\{x_{6ij}|i\in I,j\in I\}\cup\{x_{2i}|i\in I\}\cup\{x_{4j}|j\in I\}, x_{6ij}=h_2(x_{2i},x_{4j})$, $B_6=B_2\cdot B_4$.

11. The system as claimed in claim 5, characterized in that the operation supporting function G comprises $$\begin{cases} g_1(\alpha,\beta) \\ g_2(\alpha,\beta) \\ g_3(\alpha,\beta) \\ g_4(\alpha,\beta) \\ g_5(\alpha,\beta) \\ g_6(\alpha,\beta) \end{cases},$$

wherein: $g_1(\alpha,\beta)$ is the numerical fitting of $$\frac{f(\alpha)\cdot f(h_3(\alpha,\beta))}{f_2(h_1(\alpha,\beta))},$$

$g_2(\alpha,\beta)$ is the numerical fitting of $$\frac{f(\beta)\cdot f(h_3(\alpha,\beta))}{f_2(h_2(\alpha,\beta))},$$

$g_3(\alpha,\beta)$ is the numerical fitting of $$\frac{f_2(\alpha)}{f(h_4(\alpha,\beta))},$$

$g_4(\alpha,\beta)$ is the numerical fitting of $$\frac{f_2(\beta)}{f(h_4(\alpha,\beta))}$$

$g_5(\alpha,\beta)$ is the numerical fitting of $$\frac{f(\alpha)\cdot f(\beta)}{f(h_5(\alpha,\beta))},$$

$g_6(\alpha,\beta)$ is the numerical fitting of $$\frac{f(\alpha)}{f(\beta)\cdot f(h_6(\alpha,\beta))},$$

$\alpha,\beta\in X$, $h_1(\alpha,\beta)$, $h_2(\alpha,\beta)$, $h_3(\alpha,\beta)$ and $h_4(\alpha,\beta)$ are any functions that satisfy $h_1(\alpha,\beta)\neq h_2(\alpha,\beta)\neq h_3(\alpha,\beta)\neq h_4(\alpha,\beta)\neq\alpha\neq\beta$; $f_2()$ is randomly generated function used for encrypting the operation supporting function,
the corresponding homomorphic operation comprises:
i) addition and subtraction between ciphertext and ciphertext: $C_r=C_2\pm C_1$, $C_r=\{A_r,X_r,B_r\}$, wherein:

$A_r\{a_{ri}|i\in I\}$, $a_{ri}=g_6\cdot[a_{2i}\cdot g_1(x_{2i},x_{1i})\cdot g_3(h_1(x_{2i},x_{1i}),h_2(x_{2i},x_{1i}))\pm a_{1i}\cdot g_2(x_{2i},x_{1i})\cdot g_4(h_1(x_{2i},x_{1i}),h_2(x_{2i},x_{1i}))]$, $X_r = \{x_{ri} | i \in I\}$, $x_{ri} = h_6(h_4(h_1(x_{2i},x_{1i}),h_2(x_{2i},x_{1i})),h_3(h_1(x_{2i},x_{1i}),h_2(x_{2i},x_{1i})))$, $B_r = B_2 \pm B_1$;

ii) multiplication between ciphertext and ciphertext: $C_r = C_3 \cdot C_4$, $C_r = \{A_r, X_r, B_r\}$, wherein $A_r = \{a_{rij} | i \in I, j \in I\} \cup \{B_4 \cdot a_{3i} | i \in I\} \cup \{B_3 \cdot a_{4j} | j \in I\}$, $a_{rij} = a_{3i} \cdot a_{4j} \cdot g_5(x_3, x_4)$, $X = \{x_{rij} | i \in I, j \in I\} \cup \{x_{3i} | i \in I\} \cup \{x_{4j} | j \in I\}, x_{rij} = h_5(x_{3i}, x_{4j})$, $B_r = B_3 \cdot B_4$;

ii) division between ciphertext and ciphertext: $C_r = C_a/C_b$, $C_r = \{A_5, X_5, B_5, A_6, X_6, B_6\}$ wherein:

$A_5 = \{a_{5ij} | i \in I, j \in I\} \cup \{B_3 \cdot a_{1i} | i \in I\} \cup \{B_1 \cdot a_{3j} | j \in I\}$, $a_{5ij} = \alpha_{1i} \cdot a_{3j} \cdot g_5(x_1, x_3)$, $X_5 = \{x_5 | i \in I, j \in I\} \cup \{x_{1i} | i \in I\} \cup \{x_{3j} | j \in I\}, x_{5ij} = h_5(x_{1i}, x_{3j})$, $B_5 = B_1 \cdot B_3$, $A_6 = \{a_{6ij} | i \in I, j \in I\} \cup \{B_4 \cdot a_{2i} | i \in I\} \cup \{B_2 \cdot a_{4j} | j \in I\}$, $a_{6ij} = a_{2i} \cdot a_{4j} \cdot g_5(x_2, x_4)$, $X_6 = \{x_{6ij} | i \in I, j \in I\} \cup \{x_{2i} | i \in I\} \cup \{x_{4j} | j \in I\}, x_{6ij} = h_5(x_{2i}, x_{4j})$, $B_6 = B_2 \cdot B_4$.

12. The system as claimed in claim 5, characterized in that the composite function $f(\ )$ is a periodic function.

\* \* \* \* \*